US012782601B2

(12) United States Patent
Marvaniya et al.

(10) Patent No.: US 12,782,601 B2
(45) Date of Patent: Nov. 3, 2026

(54) USING MACHINE LEARNING FOR MODELING CLIMATE DATA

(71) Applicant: International Business Machines Corporation, Armonk, NY (US)

(72) Inventors: Smitkumar Narotambhai Marvaniya, Bangalore (IN); Tejas Indulal Dhamecha, Bangalore (IN); Jitendra Singh, Noida (IN)

(73) Assignee: International Business Machines Corporation, Armonk, NY (US)

( * ) Notice: Subject to any disclaimer, the term of this patent is extended or adjusted under 35 U.S.C. 154(b) by 660 days.

(21) Appl. No.: 17/536,477

(22) Filed: Nov. 29, 2021

(65) Prior Publication Data

US 2023/0168411 A1 Jun. 1, 2023

(51) Int. Cl.

| | |
|---|---|
| ***G01W 1/10*** | (2006.01) |
| ***G01W 1/00*** | (2006.01) |
| ***G06N 3/08*** | (2023.01) |

(52) U.S. Cl.

CPC ................ *G01W 1/10* (2013.01); *G06N 3/08* (2013.01); *G01W 2001/006* (2013.01)

(58) Field of Classification Search

None

See application file for complete search history.

(56) References Cited

U.S. PATENT DOCUMENTS

| | | | | |
|---|---|---|---|---|
| 7,080,026 | B2 | 7/2006 | Singh et al. | |
| 7,584,116 | B2 | 9/2009 | Kakouros et al. | |
| 2019/0367019 | A1* | 12/2019 | Yan | B60W 30/09 |
| 2020/0286105 | A1 | 9/2020 | Joseph et al. | |
| 2021/0027504 | A1 | 1/2021 | Garvey et al. | |
| 2021/0199850 | A1 | 7/2021 | Schmude et al. | |
| 2021/0334475 | A1 | 10/2021 | He et al. | |
| 2022/0146707 | A1* | 5/2022 | Kim | G06N 3/08 |
| 2022/0245448 | A1* | 8/2022 | Ni | G06N 20/00 |

(Continued)

FOREIGN PATENT DOCUMENTS

| | | | |
|---|---|---|---|
| CA | 3123387 | A1 | 11/2021 |
| CN | 109948678 | A | 6/2019 |

(Continued)

OTHER PUBLICATIONS

Devlin, Jacob, et al. "Bert: Pre-training of deep bidirectional transformers for language understanding." Proceedings of the 2019 conference of the North American chapter of the association for computational linguistics: human language technologies, vol. 1 (long and short papers). 2019. (Year: 2019).*

(Continued)

*Primary Examiner* — Michelle T Bechtold
*Assistant Examiner* — Kaitlyn R Lau
(74) *Attorney, Agent, or Firm* — Kelsey M. Skodje; Ryan, Mason & Lewis, LLP

(57) ABSTRACT

Techniques for using machine learning to model climatic data are disclosed. In one example, a computer implemented method comprises receiving climate data comprising a plurality of spatial components and a plurality of temporal components, and masking a portion of the climate data. A machine learning model is trained, wherein the training is based at least in part on the masked portion of the climate data. A vector representation of the climate data is generated via the machine learning model.

20 Claims, 10 Drawing Sheets

(56) References Cited

U.S. PATENT DOCUMENTS

| | | | | |
|---|---|---|---|---|
| 2022/0261928 A1* | 8/2022 | Malizia | G06N 20/20 |
| 2023/0087777 A1* | 3/2023 | Sha | G06N 3/084 706/26 |

FOREIGN PATENT DOCUMENTS

| | | | |
|---|---|---|---|
| CN | 110222908 A | 9/2019 |
| CN | 112384909 A | 2/2021 |
| JP | 4202890 B2 | 12/2008 |
| JP | 2020-166622 A | 10/2020 |
| JP | 2022-187043 A | 12/2022 |
| WO | 2021/007352 A1 | 1/2021 |

OTHER PUBLICATIONS

Grigsby, Jake, et al. "Long-range transformers for dynamic spatiotemporal forecasting." arXiv preprint arXiv:2109.12218 (2021). (Year: 2021).*

Webersinke, Nicolas, et al. "Climatebert: A pretrained language model for climate-related text." arXiv preprint arXiv:2110.12010 (2021). (Year: 2021).*

J. Bodenstab, "Using Weather and Climate Data to Improve Demand Forecasting," Toolsgroup, https://www.toolsgroup.com/blog/using-weather-and-climate-data-to-improve-demand-forecasting/, Dec. 6, 2016, 8 pages.

A. M. Brockway et al., "Weathering Adaptation: Grid Infrastructure Planning in a Changing Climate," Climate Risk Management, Jan. 2020, 24 pages.

F. Babongo et al., "Using Weather Data to Improve Demand Forecasting for Seasonal Products," International Journal of Services and Operations Management, vol. 31, No. 1, Jan. 2018, 24 pages.

V. Torralba et al., "Seasonal Climate Prediction: A New Source of Information for the Management of Wind Energy Resources," Journal of Applied Meteorology and Climatology, Feb. 2017, 17 pages.

S. F. Tekin et al., "Spatio-temporal Weather Forecasting and Attention Mechanism on Convolutional LSTMs," ResearchGate preprint, Feb. 2021, 14 pages.

S. Rasp et al., "Data-driven Medium-range Weather Prediction with a Resnet Pretrained on Climate Simulations: A New Model for WeatherBench," Journal of Advances in Modeling Earth Systems, arXiv:2008.08626v2, Nov. 18, 2020, 15 pages.

Y. Liu et al., "RoBERTa: A Robustly Optimized BERT Pretraining Approach," arXiv:1907.11692v1, Jul. 26, 2019, 13 pages.

J. Devlin et al., "BERT: Pre-training of Deep Bidirectional Transformers for Language Understanding," arXiv:1810.04805v2, May 24, 2019, 16 pages.

Z. Yang et al., "XLNet: Generalized Autoregressive Pretraining for Language Understanding," arXiv:1906.08237v2, Jan. 2, 2020, 18 pages.

C. D. Watson et al., "Investigating Two Super-resolution Methods for Downscaling Precipitation: ESRGAN and CAR," 34th Conference on Neural Information Processing Systems, 2020, 5 pages.

D. Salinas et al., "DeepAR: Probabilistic Forecasting with Autoregressive Recurrent Networks," arXiv:1704.04110v3, Feb. 22, 2019, 12 pages.

B. Lim et al., "Temporal Fusion Transformers for Interpretable Multi-horizon Time Series Forecasting," arXiv:1912.09363v3, Sep. 27, 2020, 27 pages.

P. Mell et al., "The NIST Definition of Cloud Computing," Recommendations of the National Institute of Standards and Technology, Special Publication 800-145, Sep. 2011, 7 pages.

M. Gupta, "Attention is All You Need: Understanding with Example," https://medium.com/data-science-in-your-pocket/attention-is-all-you-need-understanding-with-example-c8d074c37767, May 4, 2021, 24 pages.

Wikipedia, "BERT (language model)" https://en.wikipedia.org/w/index.php?title=BERT_(language_model)&oldid=1046846767, Sep. 27, 2021, 5 pages.

Wikipedia, "Word2vec," https://en.wikipedia.org/w/index.php?title=Word2vec&oldid=1050120682, Oct. 15, 2021, 7 pages.

Wikipedia, "Transformer (machine learning model)" https://en.wikipedia.org/w/index.php?title=Transformer_(machine_learning_model)&oldid=1051918971, Oct. 26, 2021, 7 pages.

S. Goel, "BERT," https://medium.com/@shoray.goel/bert-f6d23b06069f, Jul. 22, 2019, 9 pages.

M. Gupta, "BERT: A Deeper Dive," https://medium.com/data-science-in-your-pocket/bert-a-deeper-dive-7412db7c1a93, May 11, 2021, 16 pages.

M. Pourreza, "Summary of BERT: Pre-training of Deep Bidirectional Transformers for Language Understanding," https://medium.com/@mpourreza/summary-of-bert-pre-training-of-deep-bidirectional-transformers-for-language-understanding-2ea0b5496c27, Apr. 1, 2020, 5 pages.

Omnisci, Inc. "What is Spatial Temporal?" https://www.omnisci.com/technical-glossary/spatial-temporal, Accessed Nov. 3, 2021, 4 pages.

U.S. Appl. No. 17/219,272 filed in the name of Smitkumar Marvaniya et al. filed Mar. 31, 2021, entitled "Auto-Discovery of Reasoning Knowledge Graphs in Supply Chains."

U.S. Appl. No. 17/401,548 entitled "Trend-Informed Demand Forecasting."

Japan Patent Office, "Notice of Reasons for Refusal" Feb. 10, 2026, 03 Pages, JP Application No. 2022-187043.

The State Intellectual Property Office of People's Republic of China, "First Office Action", Jun. 27, 2026, 18 Pages, CN Application No. 202211480407.X.

Zerveas et al., "A Transformer-Based Framework for Multivariate Time Series Representation Learning," arXiv, arXiv:2010.02803v3 [cs.LG], Dec 8, 2020, 20 pages.

* cited by examiner

Histogram of Temperature

Histogram of Temperature Forecast

USING MACHINE LEARNING FOR MODELING CLIMATE DATA

BACKGROUND

Changes in climate and disruptive climate-related events such as, for example, hurricanes or storms, may affect numerous applications including those in the retail, financial and utility spaces. Understanding climate trends and accurately predicting climatic activity is crucial for effective forecasting of public and private enterprise activities.

SUMMARY

Embodiments of the invention provide techniques for using machine learning to model climatic data.

In one illustrative embodiment, a computer implemented method comprises receiving climate data comprising a plurality of spatial components and a plurality of temporal components, and masking a portion of the climate data. A machine learning model is trained, wherein the training is based at least in part on the masked portion of the climate data. A vector representation of the climate data is generated via the machine learning model.

Further illustrative embodiments are provided in the form of a computer program product comprising a non-transitory computer readable storage medium having embodied therein executable program code that when executed by a processor causes the processor to perform the above computer implemented method. Still further illustrative embodiments comprise an apparatus or system with a processor and a memory configured to perform the above computer implemented method.

These and other features and advantages of embodiments described herein will become more apparent from the accompanying drawings and the following detailed description.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass a wide variety of processing systems, by way of example only, processing systems comprising cloud computing and storage systems as well as other types of processing systems comprising various combinations of physical and/or virtual processing resources.

As mentioned above in the background section, understanding climate trends and accurately predicting climatic activity is important for effective forecasting of enterprise activities. For example, some retailers have recognized the impact of weather in their demand forecasts and may have relied on short-term weather forecasts to implement plans to address weather-related hazards such as, for example, floods, droughts, hurricanes and storms. However, encoding mid to long-term seasonal weather data in use-case machine learning models is challenging. The uncertainties associated with mid to long-term weather data based on, for example, different geographic areas and temporal variables, create complexities in generating and training machine learning models to predict climatic events and using the predictions in downstream use cases such as, for example, demand and supply chain forecasts.

The embodiments advantageously provide techniques for encoding spatio-temporal climate data into vector representations for efficiently solving climate-aware forecasting use cases across domains, regions and/or timeframes. The encoding is performed using climate masking techniques and a next climate forecast model for pre-training a climate data to vector ("climate2vec") machine learning model. The embodiments further provide techniques for fine-tuning the climate2vec model to implement various downstream applications, such as, for example, climate-aware forecasting including, but not necessarily limited to, demand prediction at retail nodes in a supply chain and lead-time forecasts.

Figure 1:
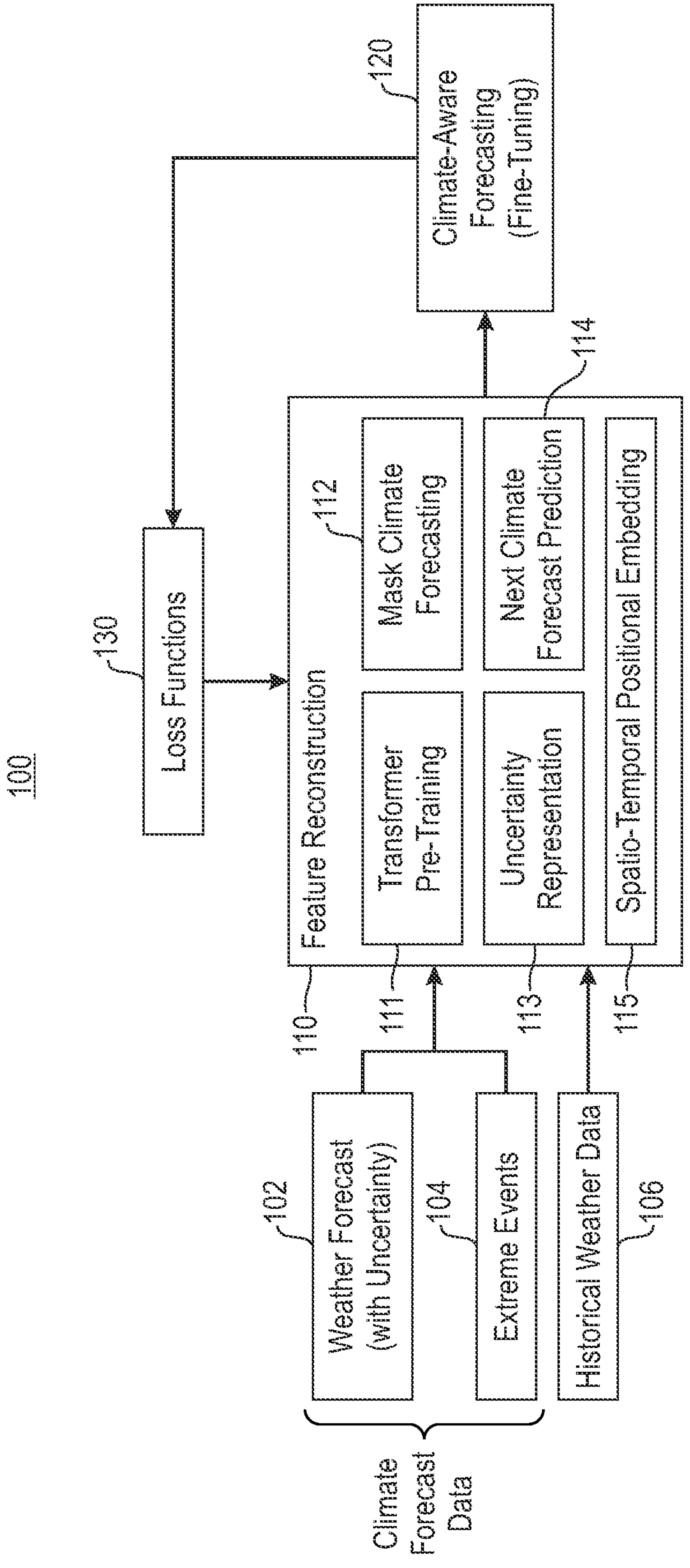
FIG. 1 illustrates a system for modeling climate data according to an illustrative embodiment.

FIG. 1 depicts a system 100 for modeling climate data according to an illustrative embodiment. As shown in FIG. 1 by lines and/or arrows, the components of the system 100 are operatively connected to each other via, for example, physical connections, such as wired and/or direct electrical contact connections, and/or wireless connections, such as, for example, WiFi, BLUETOOTH, IEEE 802.11, and/or other networks, including but not limited to, a local area network (LAN), wide area network (WAN), cellular network, ad hoc networks (e.g., wireless ad hoc network (WANET)), satellite network or the Internet. For example, a network can operatively link a feature reconstruction engine 110 to a climate-aware forecasting engine 120 and the components thereof.

The system 100 comprises the feature reconstruction engine 110, which includes a transformer pre-training layer 111, a mask climate forecasting layer 112, an uncertainty representation layer 113, a next climate forecast prediction layer 114 and a spatio-temporal positional embedding layer 115.

As shown in FIG. 1, climate forecast data, including weather forecast data 102 and extreme events data 104, is input to the feature reconstruction engine 110. The weather forecast data 102 includes, for example, temperature, humidity, wind speed and direction, precipitation (e.g., snow, rain, etc.), barometric pressure and other weather-related feature information over one or more time periods (e.g., hour, day, week, month, seasonal, decadal, etc.) and tied to one or more geographic regions (e.g., city, state, province, country, continent or other regional grouping (e.g., coastal and inland areas, hemisphere, etc.). The weather forecast data 102 further comprises an uncertainty element. For example, the forecasts may comprise predictions within a specified uncertainty range for items such as, but not necessarily limited to, temperature, humidity and/or precipitation. Uncertainty may be associated with mid-term to long-term climate variability. The extreme events data 104 comprises, for example, forecasts for extreme events including, but not necessarily limited to, hurricanes, storms, tornadoes, heatwaves, cold waves, typhoons or other extreme weather events tied to one or more time periods and one or more geographic regions. The data inputted to the feature reconstruction engine 110 also includes historical weather data 106 comprising, for example, historical weather observation data in the form of time-series data comprising a collection of weather observations from repeated measurements of, for example, temperature, humidity, wind speed and direction, precipitation, barometric pressure and other weather-related features on an hourly, daily, weekly, monthly, seasonal or decadal basis for different geographic regions. In some embodiments, future time-series data may also be inputted to the feature reconstruction engine 110 with the historical time-series data.

The climate forecast data 102, 104 and historical weather data 106 (which may collectively be referred to herein as "climate data") inputted to the feature reconstruction engine 110 comprises geo-spatial and spatio-temporal characteristics. As used herein, the term "geo-spatial" is to be broadly construed to refer to, for example, a geographic location. As used herein, the term "spatio-temporal" is to be broadly construed to refer to, for example, existing in both space (e.g., location) and time. For example, the embodiments model climate data across geographies (USA, India, Africa, etc.) and across time periods (e.g., from 2000 to 2021). Some climatic zones associated with the inputted climate data 102, 104 and 106 may be defined using one or more of the following indicators: tropical, arid, temperate, continental, polar, coastal, inland, city, rural, height above sea level, agricultural, non-agricultural, forest, residential and commercial.

In a non-limiting example, the inputted climate data 102, 104 and/or 106 may comprise a set of geo-spatial, climate data sequences $S=\{S_1, S_2, \ldots, S_n\}$ across different geographies and time periods. Each sequence $S_1$ captures climate time-series data. For example, $S_1=\{C_{t1}^i, C_{t2}^i, \ldots, C_{tk}^i\}$. The set S includes spatio-temporal data across locations and time-periods. Accordingly, the climate data 102, 104 and/or 106 comprises a plurality of spatial components and a plurality of temporal components.

Referring to FIG. 1, the mask climate forecasting layer 112, next climate forecast prediction layer 114 and spatio-temporal positional embedding layer 115 are used by the transformer pre-training layer 111 to pre-train a plurality of transformers of a transformer-based neural network machine learning model. As used herein, a "transformer" is to be broadly construed to refer to a deep learning model that differentially weighs the significance of portions of input data. Similar to recurrent neural networks (RNNs), transformers manage sequential input data. However, transformers do not necessarily process the data in order, and utilize mechanisms which provides context for any position in an input sequence. By identifying context, a transformer does not need to process the beginning of a data sequence before the end of the data sequence, which allows for more parallelization than RNNs to reduce training time. A non-limiting example of a transformer-based neural network machine learning model that may be used by the embodiments is a Bidirectional Encoder Representations from Transformers (BERT) model, which uses context from both directions, and uses encoder parts of transformers to learn a representation for each token.

The mask climate forecasting layer 112 implements masking strategies for weather forecast data 102, extreme events data 104 or historical weather data 106, which make use of climatology data for predetermining climate predictability for various regions for certain timeframes, while masking the weather forecast data 102, extreme events data 104 or historical weather data 106. The mask climate forecasting layer 112 determines how much weather forecast data 102, extreme events data 104 or historical weather data 106 to mask (e.g., percentage) and which portions to mask. Masking strategies vary based on granularity (e.g., daily, weekly, hourly, etc.) of the weather forecast data 102, extreme events data 104 or historical weather data 106. Referring to the block diagram 211 of training of a machine learning model for climate data in FIG. 2, in one or more embodiments, a masked climate model masks portions of input weather forecast data 102, extreme events data 104 or historical weather data 106 for a first timestamp Ta ("Climate Data For Timestamp Ta") and portions of input weather forecast data 102 or extreme events data 104 for a second timestamp Tb ("Climate Data For Timestamp Tb") and attempts to predict the masked portions using their context (e.g., surrounding climate data). As noted in FIG. 2, the input weather forecast data 102, extreme events data 104 or historical weather data 106 comprises an unlabeled climate data pair. The input climate data is shown in a time series based on days, but the embodiments are not limited thereto, and other granularities (e.g., hours, weeks, months, etc.) can be used.

In addition to masking, the transformer pre-training layer 111 uses next climate forecast prediction techniques on the unlabeled climate data in connection with pre-training of the plurality of transformers. For example, various pairs of climate data points from the weather forecast data 102, extreme events data 104 or historical weather data 106 are generated based on climatology and historical weather data 106. For example, in a given pair, climate attributes of a first half of a given time period (e.g., a week) are followed by climate attributes of a second half of a given time period (e.g., a week). The next climate forecast prediction layer 114 predicts the climate attributes of the second half of the time period. Next climate forecast prediction replaces the next climate forecast with random climate forecasts from a corpus in order to train a model that is capable of understanding climate forecast relationships. For example, part of the time the next climate forecast is the original next climate forecast, and part of the time, the original next climate forecast is replaced with a random climate forecast from a corpus. For a given climate data sequence, the transformer pre-training layer 111 attempts to predict masked climate data, determine climate data sequence order (e.g., the correct sequence or whether the sequence needs to be re-ordered), and to predict climate data of a next timestamp (e.g., given climate data for K timestamps, predict climate data for the next timestamp).

Figure 2:
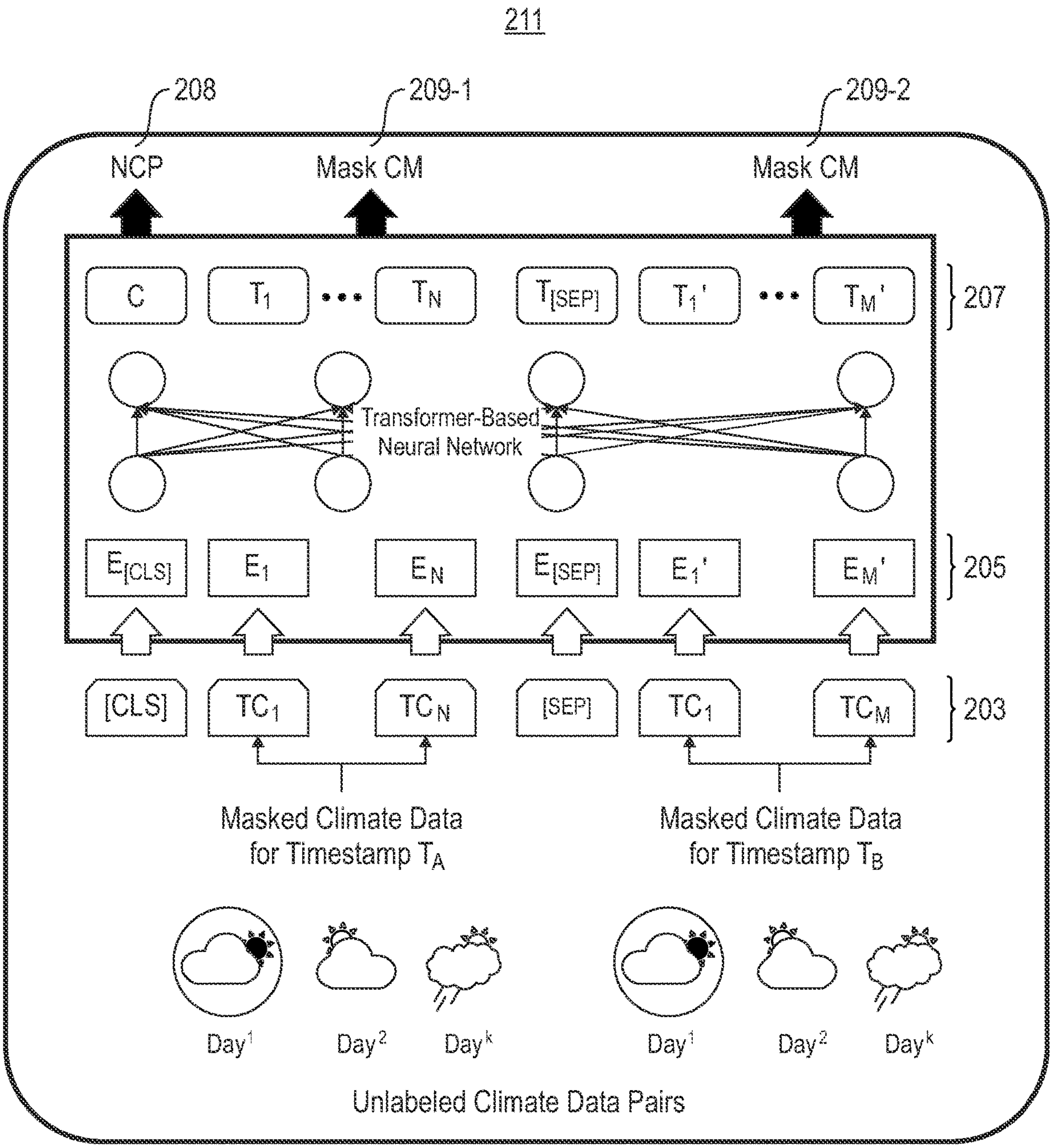
FIG. 2 depicts a block diagram of training of a machine learning model for climate data according to an illustrative embodiment.

Referring to FIG. 2, in connection with pre-training the transformer-based neural network, climate data for two different timestamps Ta and Tb is simultaneously managed.

For example, a climate data pair is input to the machine learning model with a separation [SEP] between each part of the pair. A first token of the input is represented as [CLS] which, after pre-training ("C"), can be used for aggregate sequence representation and can be employed for classification. "E" in FIG. 2 refers to an input embedding. The first sequence before the [SEP] token can be any contiguous span of climate data at different granularities. In addition, as explained in more detail in connection with the spatio-temporal positional embedding layer 115, tokens have a learned embedding indicating whether a token belongs to a first part or a second part of a climate data pair.

As explained in more detail in connection with FIG. 3, the input embedding is based on multiple embedding vectors including, for example, positional embedding, seasonal embedding, and climate attribute embedding vectors.

Pre-training the transformer-based neural network is unsupervised, where training data comprises the climate forecast data 102, 104 and/or historical weather data 106. Mask climate forecasting (in FIG. 2, mask climate method "Mask CM 209-1 and 209-2") and next climate forecasting prediction (in FIG. 2, next climate prediction "NCP 208") are the unsupervised methods used for training. In one or more embodiments, given inputted climate data, the mask climate forecasting layer 112 randomly masks some portion of the inputted forecast and predicts the masked climate token(s) using its context.

In the next climate forecasting prediction task, the next climate forecast prediction layer 114 given climate forecast data for two timestamps (e.g., timestamps Ta and Tb) predicts whether the climate forecast data for the second timestamp (e.g., timestamp Tb) follows the climate forecast data for the first timestamp (e.g., timestamp Ta). In training, a certain percentage of the time, the climate forecast data for the second timestamp correctly follows the climate forecast data for the first timestamp, while a remaining percentage of the time, the climate forecast data for the second timestamp is a random forecast from the corpus. The mask climate forecasting and next climate forecasting prediction tasks are combined, and the transformer-based neural network model is trained with combined loss functions 130 (see FIG. 1). The loss functions 130 comprise, for example, a triplet loss function, a cross entropy loss function, a reconstruction cost loss function and/or a data loss function. The training relies on an autoregressive model, which is a time series model that uses observations from previous time steps as input to a regression algorithm to predict values at a next time step.

Figure 3:
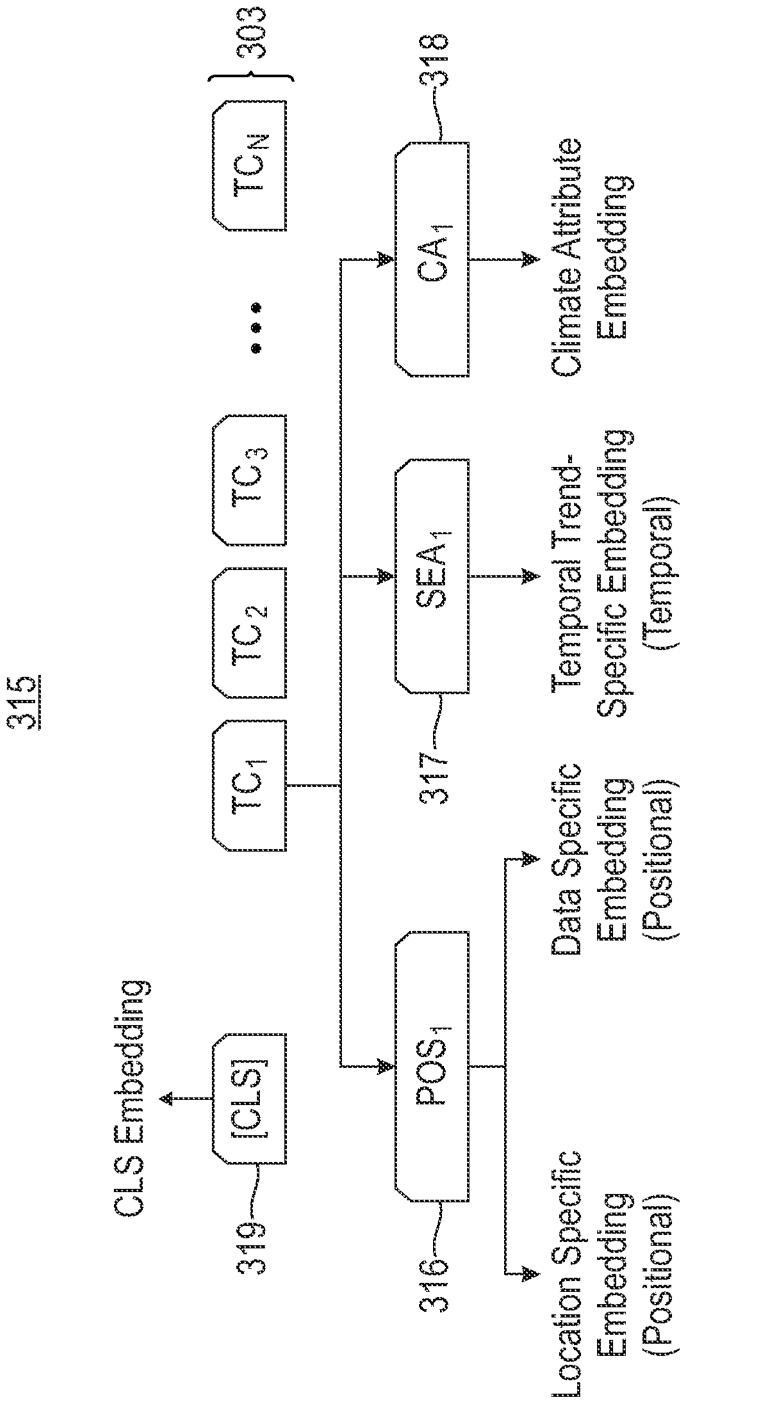
FIG. 3 depicts a block diagram of spatio-temporal positional embedding in connection with modeling of climate data according to an illustrative embodiment.
Figure 4:
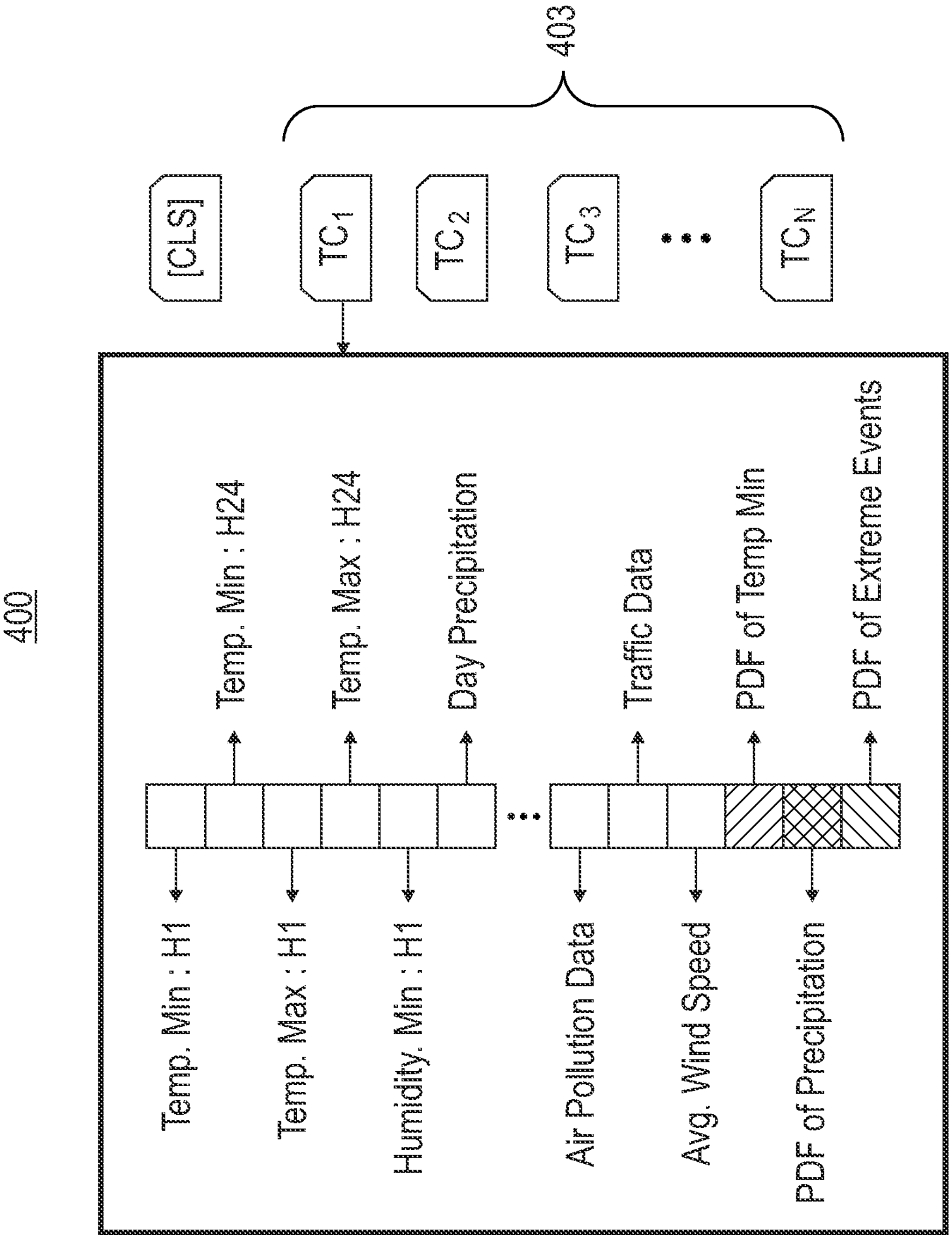
FIG. 4 depicts an example of a climate token used in connection with modeling of climate data according to an illustrative embodiment.
Figure 6A:
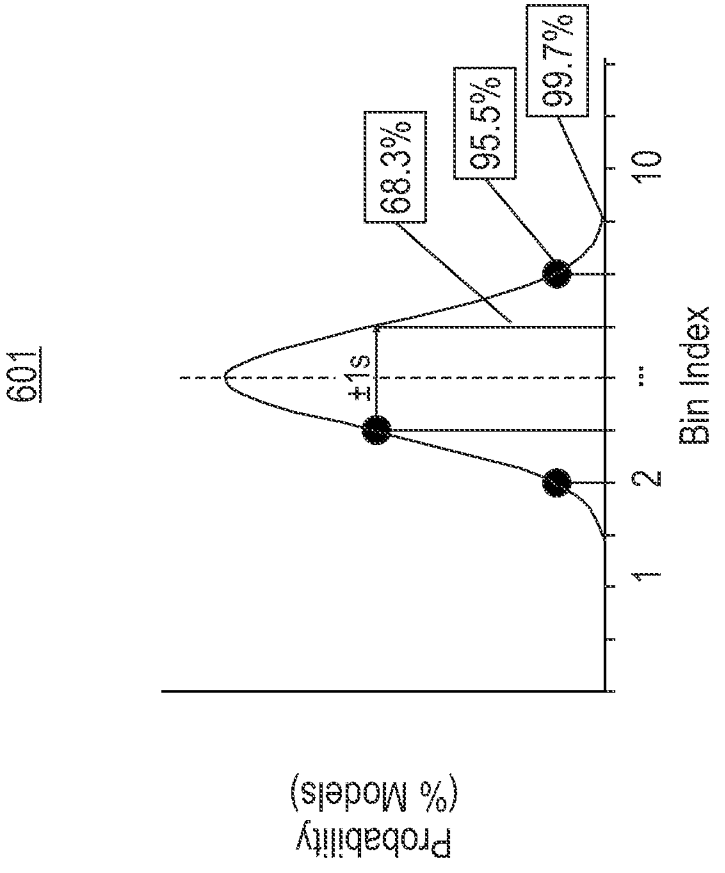
FIG. 6A depicts a histogram of temperature according to an illustrative embodiment.
Figure 6B:
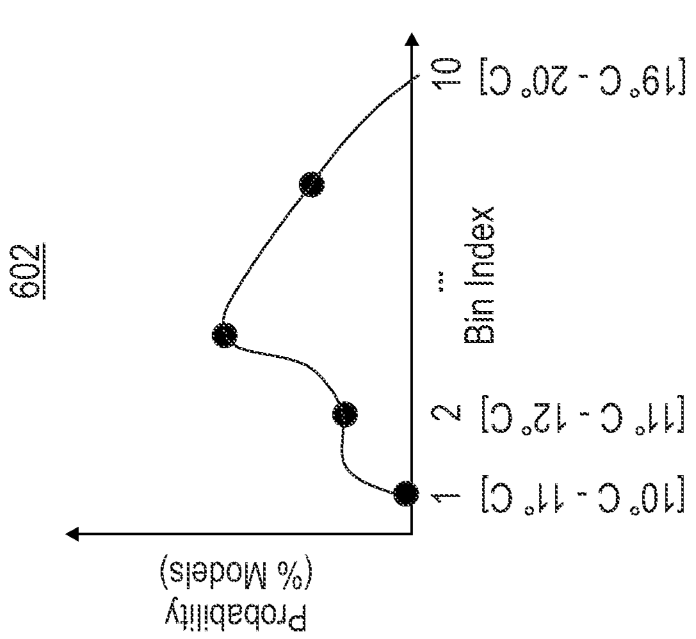
FIG. 6B depicts a histogram of a temperature forecast according to an illustrative embodiment.

Referring to FIGS. 2 and 3, in an example of spatio-temporal positional embedding 315, the input embeddings "E" 205 are based on multiple embedding vectors including, for example, one or more positional embedding vectors ($POS_1$) 316, one or more seasonality embedding vectors ($SEA_1$) 317, and one or more climate attribute ($CA_1$) embedding vectors 318. "TC" in FIGS. 2 and 3 refers to climate tokens 203 and 303. Referring to FIG. 4, climate tokens 403 and a representation 400 of a particular one of the climate tokens 403 ($TC_1$) are depicted. According to the embodiments, time and space information are associated with each climate token. Climate tokens ($TC_1$, $TC_2$, $TC_3$, . . . , $TC_N$) can represent climate data using different temporal and spatial granularities. A climate token TC may include historical observed climate data, forecasts, hindcasts or combinations thereof. In one or more embodiments, a set of derived features (e.g., histograms, ranges, quantiles, etc.) are constructed from the probabilistic nature of seasonal forecasts. For example, FIGS. 6A and 6B illustrate temperature forecast representations using histograms 601 and 602, including uncertainties associated with the input. For example, as noted above, the weather forecast data 102 may comprise predictions within a specified uncertainty range for items such as, but not necessarily limited to, temperature, humidity and/or precipitation. As shown in the histograms 601 and 602, temperatures (e.g., 10 degrees C. to 11 degrees C., 11 degrees C. to 12 degrees C., . . . , 19 degrees C. to 20 degrees C.) are associated with different probabilities. The uncertainty representation layer 113 comprises an uncertainty-aware model which generates uncertainty scores for climate variation and disruptive event parameters.

The histogram 601 in FIG. 6A shows an example of the distribution of temperature forecasts from multiple ensemble models. Each ensemble for each climate variable is produced by varying initial conditions of climate models that perform multiple simulations, making predictions uncertain. For example, seasonal-scale forecasts from The European Centre for Medium-Range Weather Forecasts (ECMWF) contain 50 ensembles for each climate attribute up to six months in the future, which gets updated every month. The histogram 602 in FIG. 6B shows an example of an uncertainty representation of temperature variations while analyzing multiple ensembles using a histogram-based approach. The illustrated percentage values represent the agreement of ensemble forecasts. A percentage value indicates high uncertainty since there is not much agreement across the ensemble. This way uncertainty of climate forecasts can also be encoded while training the machine learning model of the feature reconstruction engine 110.

Referring back to FIG. 4, relational constraints such as, for example, minimum, maximum, average, etc. and hierarchical constraints such as, for example, hourly, daily, etc. may be incorporated into a climate token (TC). For example, in the representation 400 of the climate token $TC_1$, the climate token $TC_1$ includes minimum and maximum temperatures and/or humidity at different hours, daily precipitation values, average wind speed, as well air pollution data, traffic data and PDFs of minimum temperature, precipitation and extreme events. The mask climate forecasting layer 112 learns the latent representation of masked climate tokens by leveraging the surrounding left and right climate token information. The feature reconstruction engine 110 attempts to predict climate tokens by minimizing the surrogate loss functions 130 that take into account the predictability of climate attributes (e.g., lower for precipitation as compared to temperature) and the above-described relational and hierarchical constraints.

Referring back to FIGS. 2 and 3, the spatio-temporal positional embedding layer 115 captures different types of embedding including spatio-temporal characteristics in the embedding space while learning the transformer-based neural network machine learning model. The positional embedding 316 may capture two different types of positional characteristics: (i) location specific; and/or (ii) data specific. Location specific embedding captures locations of the climate attributes such as, but not necessarily limited to, global positioning system (GPS) location, city, region, state, resolution of the data, etc. Data specific embedding captures the data specific characteristics such as, but not necessarily limited to, climate zone, agricultural vs. non-agricultural region, city vs. rural region, residential vs commercial region, etc. In one or more embodiments, positional embedding is a function of a coordinate system.

The seasonality embedding 317 corresponds to temporal trend-specific characteristics in the climate data. Seasonality embedding facilitates learning temporal trend changes in climate geo-spatial data, while learning climate representations during the pre-training state. Seasonality embedding can be specified at multiple different granularities such as, but not necessarily limited to, diurnal, weekly, seasonal, yearly, etc. Climate attribute embedding 318 captures the latent representation of geo-spatial climate attributes. In one or more embodiments, a time stamp's embedding is the sum of exogenous factor embedding, positional embedding and temporal embedding. CLS embedding 319 refers to the learning of the overall vector representation across all of the climate tokens (TC) in order to generate climate attribute embedding for a particular time period (e.g., day, week, month, etc.). In FIG. 2, $T_i$ and $T_i'$ (207) refer to the final hidden representation of tokens i of a climate data pair for timestamp Ta and Tb.

Referring back to FIG. 1, the climate-aware forecasting engine 120 performs fine-tuning of the trained transformer-based neural network machine learning model to perform specific climate-aware forecasting in connection with the implementation of various downstream applications, such as, but not necessarily limited to, demand prediction at retail nodes in a supply chain and lead-time forecasts. In one or more embodiments, the same pre-trained parameters are used for multiple downstream tasks, with modifications corresponding to how input and output layers are used. The transformer-based neural network machine learning model is initialized with the pre-trained parameters and the climate-aware forecasting engine 120 fine-tunes parameters for the desired downstream task. For example, at the input, the two parts of a climate data pair may be different depending on the task. For example, the granularities, locations, type of weather data (e.g., temperature, precipitation, extreme events, etc.), temporal data, etc. can vary to correspond to a given downstream task. At the output, the token representations are used in an output layer for token-level tasks.

The feature reconstruction engine 110 encodes complex spatio-temporal climate data into a vector representation so that, using the trained machine learning model, the climate-aware forecasting engine 120 can efficiently solve climate-aware forecasting use cases across different domains, regions and/or timeframes.

As explained herein, the climate2vec model uses spatio-temporal positional encoding and climate masking strategies, so that given a time-series of climate data ($S_i$ as noted above) for a given location, and the pre-trained transformer-based climate model, a d-dimensional vector representation of the climate data at a plurality of geographic locations is estimated. In connection with the climate-aware forecasting engine 120, the climate2vec model generates a pre-trained climate embedding that can be used for learning a separate model for solving downstream tasks.

Advantageously, the climate2vec model encodes spatio-temporal relationships in climate data into latent space without explicitly requiring a labelled dataset. The embodiments remove the dependency on downstream tasks, and climate embedding can be used and fine-tuned for solving the downstream tasks without training a latent representation from scratch using climate data.

Figure 5:
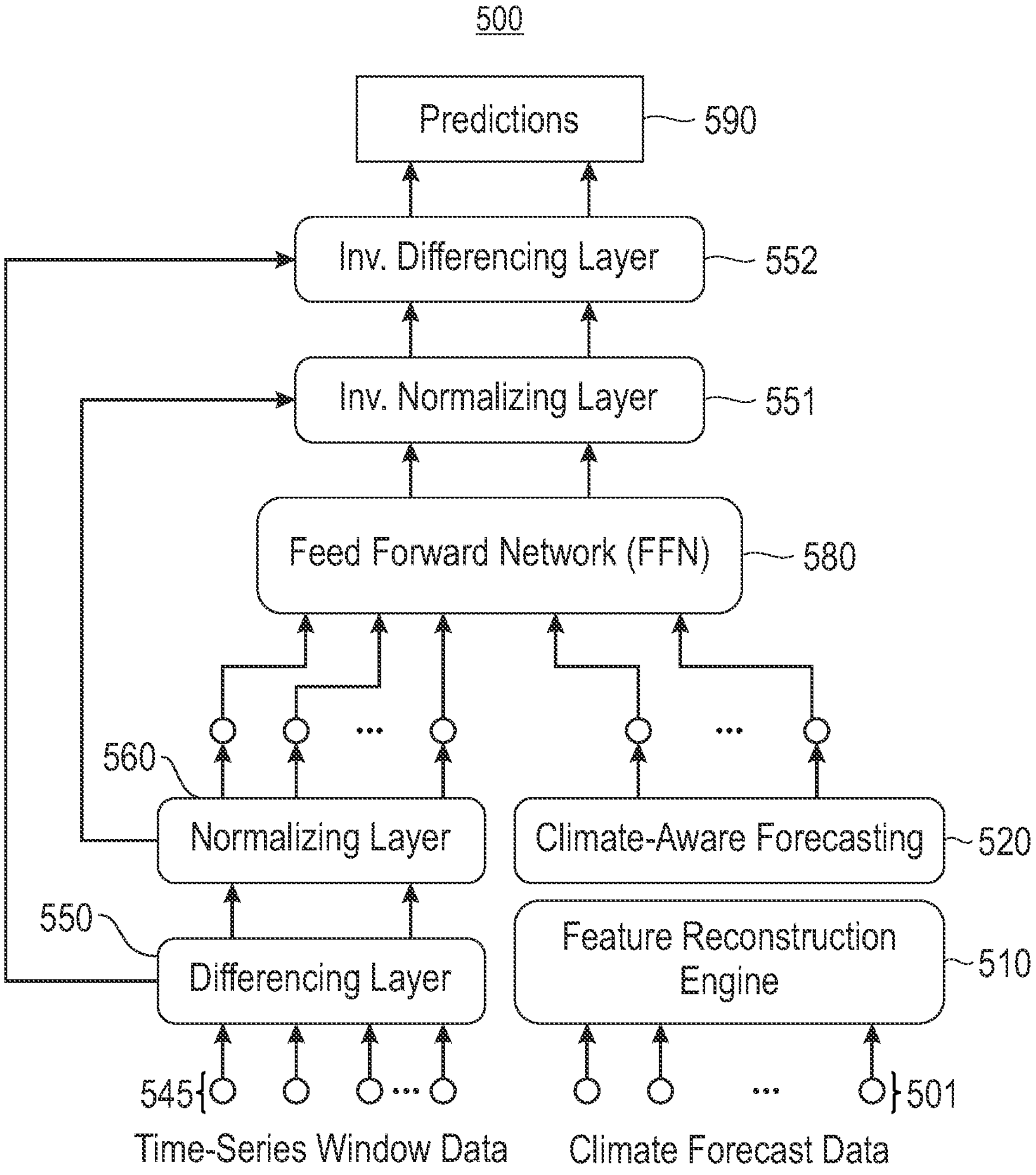
FIG. 5 depicts an operational flow for modeling and task-specific fine-tuning of climate data according to an illustrative embodiment.

Referring to the operational flow 500 in FIG. 5, climate forecast data 501 is input to a feature reconstruction engine 510, which is the same or similar to the feature reconstruction engine 110. Following analysis of the climate forecast data 501 by the feature reconstruction engine 510, the pre-trained machine learning model and parameters output from the feature reconstruction engine 510 are used by the climate-aware forecasting engine 520, which is the same or similar to the climate-aware forecasting engine 120, to perform task-specific fine-tuning. The output from the climate-aware forecasting engine 520 is provided to a feed forward network (FFN) 580, and inverse normalizing and differencing layers 551 and 552. Time-series window data 545 is provided to a differencing layer 550, the output of which is provided to a normalizing layer 560 and to the inverse differencing layer 552. The output from the normalizing layer 560 is provided to the FFN 580 and to the inverse normalizing layer 551. The output from the inverse differencing layer 552 comprises predictions 590. As can be understood from the operational flow 500 in FIG. 5, as a part of first stage, the compact representation of climate data is learned in the feature reconstruction engine 510 independent of the downstream forecasting task. In second stage, the climate-aware forecasting engine 520 solves downstream tasks by using climate embedding (e.g., climate2vec) using the pre-trained transformer-based machine learning model (learned as a part of the first stage), resulting in the predictions 590 (e.g., retail demand, peak load, etc.) used for solving downstream problems.

The differencing and normalizing layers 550 and 560 are used to efficiently represent time-series features such as, for example, historical product demand (e.g., sales) to enable transfer across a time-series. The differencing layer 550 captures relative trends within a time-series window, whereas the normalizing layer helps transform each data point such that it is window-normalized, so each input window is of comparable scale across multiple inputs.

In connection with the differencing layer 550, for time window w=(x1, . . . , xn), differentiated window w_diff is defined as w_diff=(x2−x1, . . . , xi−x(i−1), . . . , xn−x(n−1)). The procedure can be inverted by saving x1.

In connection with the normalizing layer 560, for time window w=(x1, . . . , xn), μw (resp. σw) refers to its empirical average (resp. its empirical standard deviation, without Bessel's correction). The normalized window wnorm is defined w_norm=((x1−μw)/σw, . . . , (xi−μw)/σw, . . . , (xn−μw)/σw). Normalization can be inverted by transmitting μw and σw.

According to an embodiment, the feature reconstruction engine 510 is used to efficiently encode spatio-temporal climate features using a pre-trained transformer-based model using the climate masking technique. In one or more embodiments, the feature reconstruction engine 510 is pre-trained using a generic corpus of climate data across the globe and may require fine-tuning by updating the weights of the last few layers of the transformer model for a downstream task, such as, for example, retail demand forecasting, renewable energy forecasting, etc.

The FFN 580 is trained by concatenating window normalized time-series features and compact climate features generated using a feature reconstruction engine for solving the downstream task.

Figure 7:
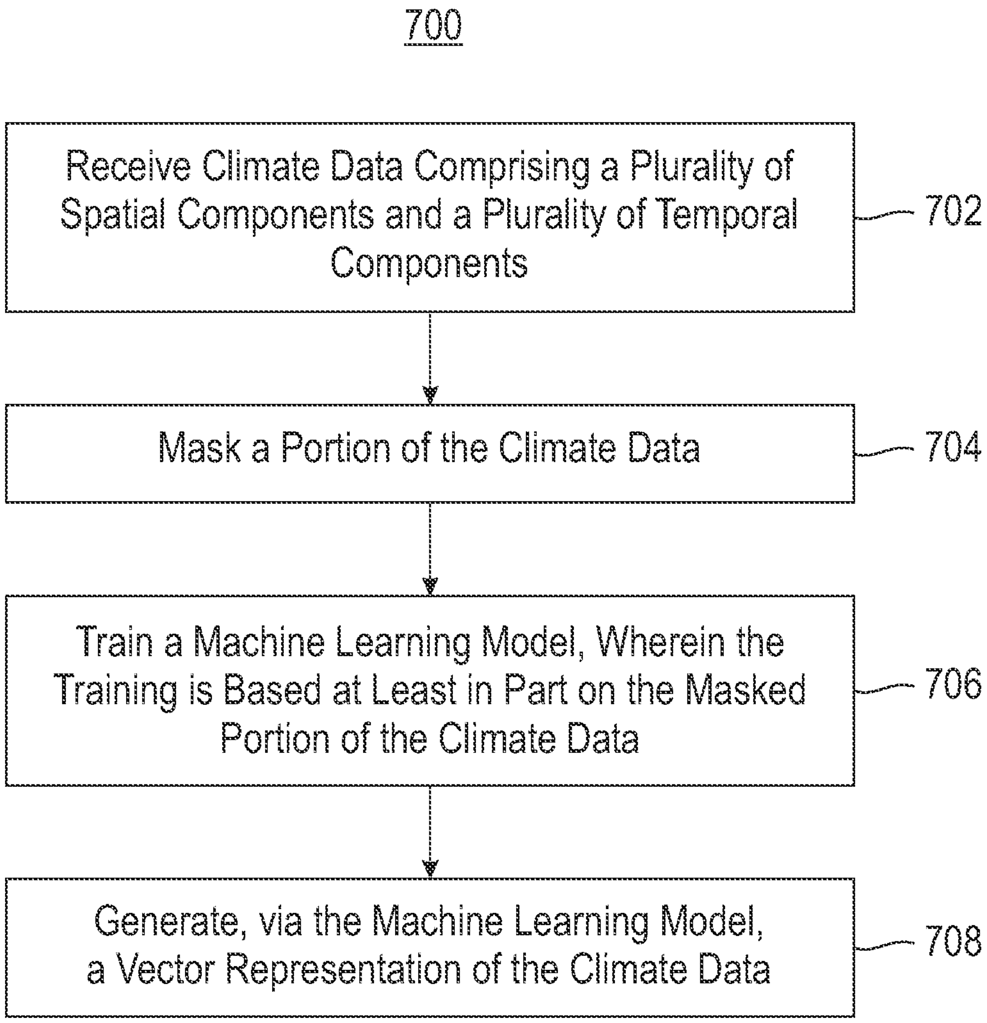
FIG. 7 illustrates a climate data modeling process flow according to an illustrative embodiment.

Taking into account the above and other features described herein, FIG. 7 illustrates a climate data modeling methodology 700 that encodes spatio-temporal climate data into vector representations for efficiently solving climate-aware forecasting use cases.

In step 702, climate data comprising a plurality of spatial components and a plurality of temporal components is received. The plurality of spatial components comprise a plurality of geographic locations and the plurality of temporal components comprise a plurality of time periods. The plurality of spatial components and the plurality of temporal components comprise different granularities. The climate data further comprises one or more climate attributes.

In step 704, a portion of the climate data is masked. A latent representation of the masked portion of the climate data is learned by leveraging one or more adjacent unmasked portions of the climate data. In learning the latent representation of the masked portion of the climate data, a loss function which accounts for one or more constraints is minimized.

In step 706, a machine learning model is trained, wherein the training is based at least in part on the masked portion of the climate data. The machine learning model comprises a transformer-based neural network.

In step 708, a vector representation of the climate data is generated via the machine learning model. The vector representation comprises one or more d-dimensional vector representations of the climate data at the plurality of geographic locations, where d is an integer.

In the method, positional embedding is performed in connection with the training of the machine learning model to capture positional characteristics of the climate data. The positional embedding comprises location specific embedding and the positional characteristics comprise location information for one or more locations associated with the climate data. The positional embedding may also comprise data specific embedding and the positional characteristics comprise climate zone information for one or more climate zones associated with the climate data.

In the method, seasonality embedding is performed in connection with the training of the machine learning model to capture temporal trend characteristics of the climate data. Climate attribute embedding may also be performed in connection with the training of the machine learning model to capture one or more latent space representations of the climate data.

According to the embodiments, the machine learning model is fine-tuned to perform one or more enterprise specific forecasting tasks. The plurality of temporal components comprise a plurality of timestamps, and the machine learning model is used to predict climate associated with a timestamp following a last timestamp of the plurality of timestamps.

The techniques depicted in FIGS. 1-7 can also, as described herein, include providing a system, wherein the system includes distinct software modules, each of the distinct software modules being embodied on a tangible computer readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer readable recordable storage medium with code adapted to be executed to carry out at least one method step described herein, including the provision of the system with the distinct software modules.

Additionally, the techniques depicted in FIGS. 1-7 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 8:
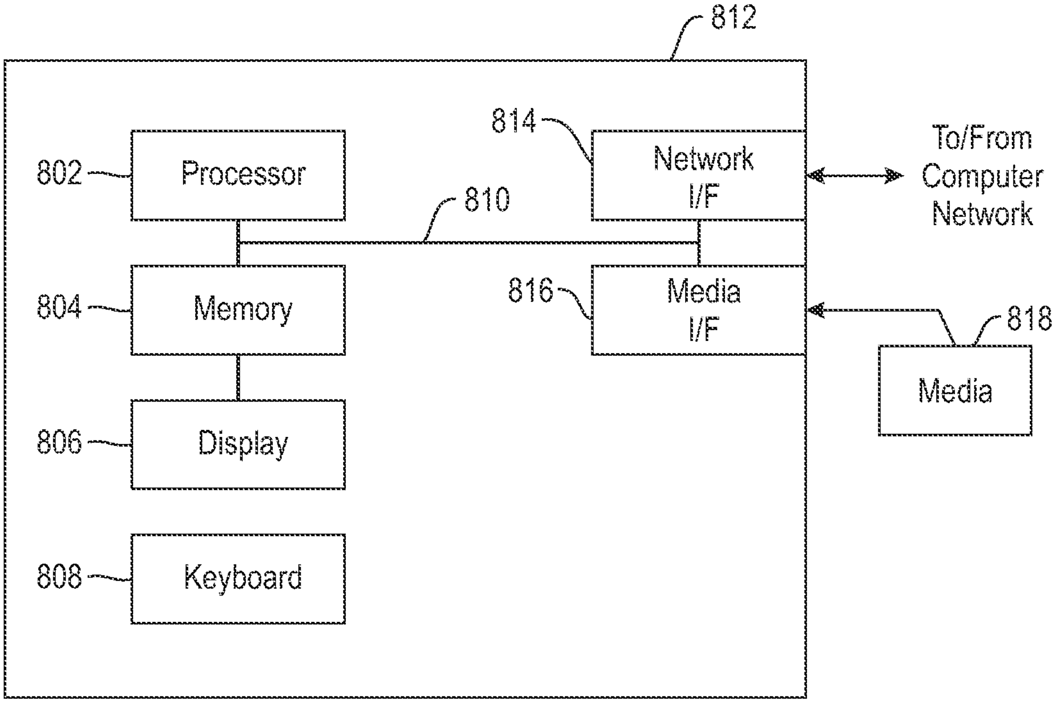
FIG. 8 illustrates an exemplary information processing system according to an illustrative embodiment.

Additionally, an embodiment of the present invention can make use of software running on a computer or workstation. With reference to FIG. 8, such an implementation might employ, for example, a processor 802, a memory 804, and an input/output interface formed, for example, by a display 806 and a keyboard 808. The term "processor" as used herein is intended to include any processing device, such as, for example, one that includes a multi-core CPU, GPU, FPGA and/or other forms of processing circuitry such as one or more ASICs. Further, the term "processor" may refer to more than one individual processor. The term "memory" is intended to include memory associated with a processor (e.g., CPU, GPU, FPGA, ASIC, etc.) such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of embodiments of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 802. Further, a computer program product can include a computer readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICs), functional circuitry, an appropriately programmed digital computer with associated memory, and the like. Given the teachings of the invention provided herein, one of ordinary skill in the related art will be able to contemplate other implementations of the components of the invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
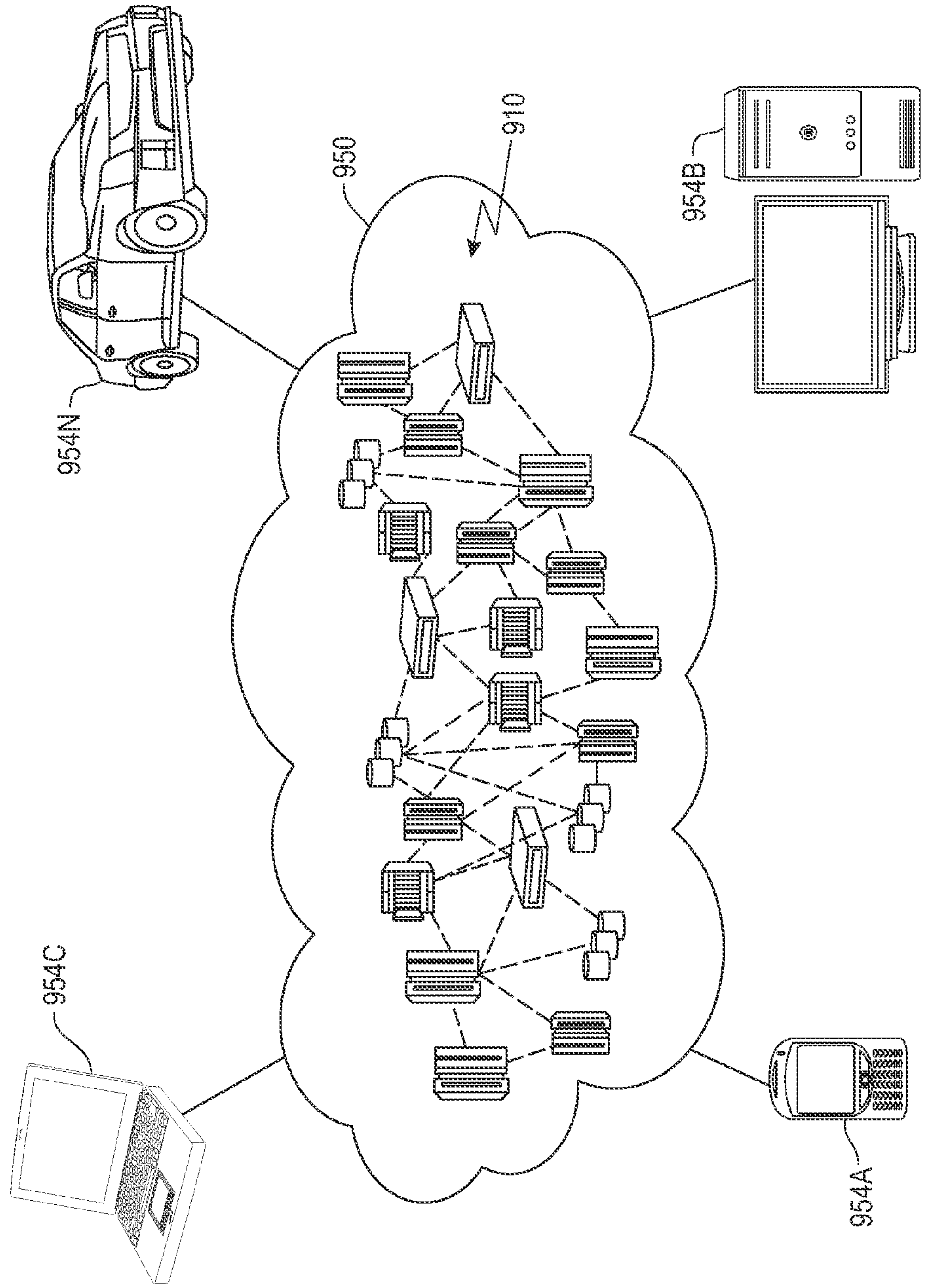
FIG. 9 illustrates a cloud computing environment according to an illustrative embodiment.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
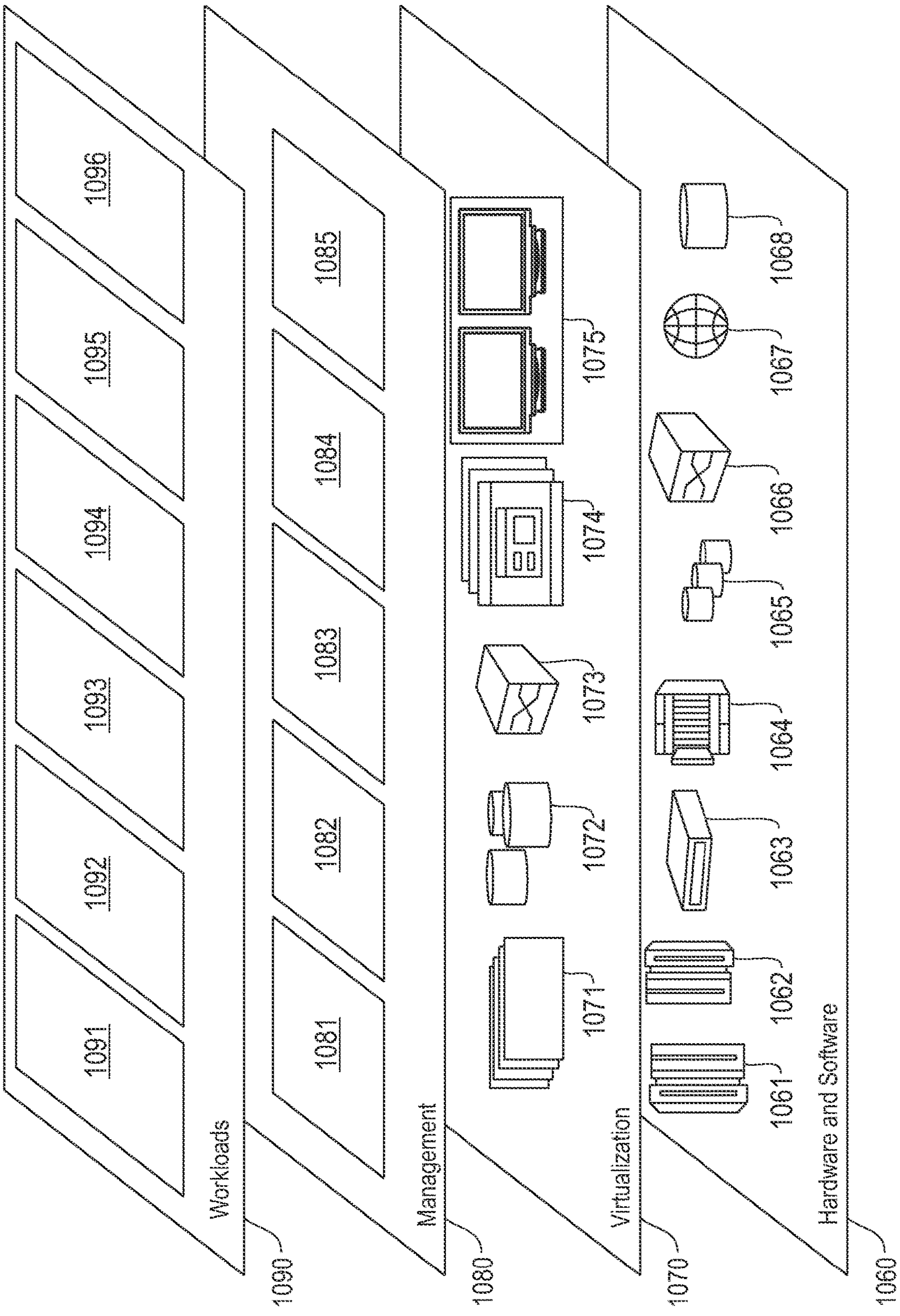
FIG. 10 illustrates abstraction model layers according to an illustrative embodiment.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture-based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075. In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and climate data modeling and forecasting 1096, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, a framework (e.g., a set of one or more framework configurations) for learning spatio-temporal uncertainty-aware climate vector representations to be used in connection with climate-aware forecasting. Unlike conventional techniques, the embodiments provide for pre-training of a deep bidirectional transformers model to capture spatio-temporal variations in inputted geo-spatial climate data based on contextual climate data from multiple sides.

The embodiments advantageously enable an attention mechanism for deep learning. For example, the embodiments use a masked climate model to enable pre-training of deep transformer based bidirectional representations. Additionally, the embodiments utilize spatio-temporal positional embedding for efficiently capturing geo-spatial data characteristics (e.g., location and data specific characteristics) for climate2vec model pre-training.

As an additional advantage, the embodiments fine-tune the climate2vec model for application to climate-aware use cases on a large suite of downstream tasks such as, but not necessarily limited to, climate-aware demand forecasting, climate-aware energy forecasting and other enterprise related tasks. The fine-tuning is performed by retraining the last few output layers of the climate2vec model for task specific climate-aware forecasting use cases.

In one or more embodiments, outputs of spatio-temporal climate forecasts are represented and translated using a neural network by learning the encoded representation of mid- to long-term seasonal climate forecasts and historical observations. Climatology (e.g., the study of climate and how it changes over time) is used for masking climate forecasts for certain timestamps (e.g., hour, day, week, etc.) to predict the original climate forecast in connection with model training. Spatio-temporal positional encoding facilitates capture of complex spatio-temporal climate variability and characteristics of different geo-spatial data (e.g., air pollution and traffic data).

The machine learning model also advantageously enforces hierarchical constraints to efficiently capture uncertainty information associated with seasonal forecasts (e.g., mean, variance, standard deviations and quartile distributions).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising a non-transitory computer readable storage medium having program instructions embodied therewith, the program instructions being executable by one or more processors to cause the one or more processors to:

perform a training process to train a machine learning neural network model that is configured to predict climatic activity, the training process comprising:

receiving climate data comprising a plurality of spatial components and a plurality of temporal components;

generating a plurality of pairs of climate data points from the climate data, wherein in a pair of climate data points of the plurality of pairs of climate data points, a first climate data point comprises climate attributes of a first half of a given time period and a second climate data point comprises climate attributes of a second half of the given time period;

embedding the plurality of pairs of climate data points with a positional embedding, a seasonality embedding and a climate attribute embedding, the positional embedding further comprising a location specific embedding and a data specific embedding;

executing a first machine learning layer of the machine learning neural network model to generate a first prediction output by randomly masking a portion of the plurality of pairs of climate data points and predicting climate attributes of the masked portion of the plurality of pairs of climate data points;

executing a second machine learning layer of the machine learning neural network model to generate a second prediction output by randomly replacing a portion of the plurality of pairs of climate data points with random climate data points and predicting whether a given climate data point of a given pair of climate data points of the plurality of pairs of climate data points is a randomly replaced climate data point of the random climate data points; and executing a third machine learning layer of the machine learning neural network model to forecast climate data for a future time period by combining the first prediction output and the second prediction output and processing the combined first prediction output and second prediction output to predict the climate data for the future time period;

modify one or more parameters of the trained machine learning neural network model based on a desired dependent task which is affected by climate, to utilize the machine learning neural network model to perform climate-aware forecasting in connection with the desired dependent task;

re-train the machine learning neural network model based on the modified one or more parameters and the combined first prediction output and second prediction output; and perform a climate-aware forecasting process in connection with the desired dependent task by utilizing the re-trained machine learning neural network model to generate a vector representation of the forecast climate data for the future time period in connection with the desired dependent task.

2. The computer program product of claim 1, wherein the plurality of spatial components comprise a plurality of geographic locations and the plurality of temporal components comprise a plurality of time periods.

3. The computer program product of claim 2, wherein the vector representation comprises one or more d-dimensional vector representations of the climate data at the plurality of geographic locations, wherein d is an integer.

4. The computer program product of claim 1, wherein the machine learning neural network model comprises a transformer-based neural network.

5. The computer program product of claim 1, wherein the positional embedding is used in connection with the training of the machine learning neural network model to capture positional characteristics of the climate data.

6. The computer program product of claim 5, wherein the location specific embedding is based on location information for one or more locations associated with the climate data.

7. The computer program product of claim 5, wherein the data specific embedding and the positional characteristics further comprise climate zone information for one or more climate zones associated with the climate data.

8. The computer program product of claim 1, wherein the seasonality embedding is used in connection with the training of the machine learning neural network model to capture temporal trend characteristics of the climate data.

9. The computer program product of claim 1, wherein the climate attribute embedding is used in connection with the training of the machine learning neural network model to capture one or more latent space representations of the climate data.

10. The computer program product of claim 1, wherein the program instructions further cause the one or more processors to fine-tune the machine learning neural network model to perform one or more enterprise specific forecasting tasks.

11. The computer program product of claim 1, wherein the plurality of spatial components and the plurality of temporal components comprise different granularities.

12. The computer program product of claim 1, wherein the climate data further comprises one or more climate attributes.

13. The computer program product of claim 1, wherein the program instructions further cause the one or more processors to learn a latent representation of the masked portion of the climate data by leveraging one or more adjacent un-masked portions of the climate data.

14. The computer program product of claim 13, wherein, in learning the latent representation of the masked portion of the climate data, the program instructions cause the one or more processors to minimize a loss function which accounts for one or more constraints.

15. The computer program product of claim 1, wherein the plurality of temporal components comprise a plurality of timestamps, and wherein the program instructions further cause the one or more processors to use the machine learning neural network model to predict climate associated with a timestamp following a last timestamp of the plurality of timestamps.

16. A computer implemented method comprising:

performing a training process to train a machine learning neural network model that is configured to predict climatic activity, the training process comprising:

receiving climate data comprising a plurality of spatial components and a plurality of temporal components;

generating a plurality of pairs of climate data points from the climate data, wherein in a pair of climate data points of the plurality of pairs of climate data points, a first climate data point comprises climate attributes of a first half of a given time period and a second climate data point comprises climate attributes of a second half of the given time period;

embedding the plurality of pairs of climate data points with a positional embedding, a seasonality embedding and a climate attribute embedding, the positional embedding further comprising a location specific embedding and a data specific embedding;

executing a first machine learning layer of the machine learning neural network model to generate a first prediction output by randomly masking a portion of the plurality of pairs of climate data points and predicting climate attributes of the masked portion of the plurality of pairs of climate data points;

executing a second machine learning layer of the machine learning neural network model to generate a second prediction output by randomly replacing a portion of the plurality of pairs of climate data points with random climate data points and predicting whether a given climate data point of a given pair of climate data points of the plurality of pairs of climate data points is a randomly replaced climate data point of the random climate data points; and executing a third machine learning layer of the machine learning neural network model to forecast climate data for a future time period by combining the first prediction output and the second prediction output and processing the combined first prediction output and second prediction output to predict the climate data for the future time period;

modifying one or more parameters of the trained machine learning neural network model based on a desired dependent task which is affected by climate, to utilize the machine learning neural network model to perform climate-aware forecasting in connection with the desired dependent task:

re-training the machine learning neural network model based on the modified one or more parameters and the combined first prediction output and second prediction output; and perform a climate-aware forecasting process in connection with the desired dependent task by utilizing via the re-trained machine learning neural network model to generate a vector representation of the forecast climate data for the future time period in connection with the desired dependent task;

wherein the computer implemented method is performed by at least one processing device comprising a processor coupled to a memory when executing program code.

17. The computer implemented method of claim 16, wherein the positional embedding is used in connection with the training of the machine learning neural network model to capture positional characteristics of the climate data.

18. The computer implemented method of claim 16, further comprising learning a latent representation of the masked portion of the climate data by leveraging one or more adjacent un-masked portions of the climate data.

19. An apparatus comprising:

at least one processing device comprising a processor coupled to a memory, the at least one processing device, when executing program code, is configured to:

perform a training process to train a machine learning neural network model that is configured to predict climatic activity, the training process comprising:

receiving climate data comprising a plurality of spatial components and a plurality of temporal components;

generating a plurality of pairs of climate data points from the climate data, wherein in a pair of climate data points of the plurality of pairs of climate data points, a first climate data point comprises climate attributes of a first half of a given time period and a second climate data point comprises climate attributes of a second half of the given time period;

embedding the plurality of pairs of climate data points with a positional embedding, a seasonality embedding and a climate attribute embedding, the positional embedding further comprising a location specific embedding and a data specific embedding;

executing a first machine learning layer of the machine learning neural network model to generate a first prediction output by randomly masking a portion of the plurality of pairs of climate data points and predicting climate attributes of the masked portion of the plurality of pairs of climate data points;

executing a second machine learning layer of the machine learning neural network model to generate a second prediction output by randomly replacing a portion of the plurality of pairs of climate data points with random climate data points and predicting whether a given climate data point of a given pair of climate data points of the plurality of pairs of climate data points is a randomly replaced climate data point of the random climate data points; and executing a third machine learning layer of the machine learning neural network model to forecast climate data for a future time period by combining the first prediction output and the second prediction output and processing the combined first prediction output and second prediction output to forecast predict the climate data for the future time period;

modify one or more parameters of the trained machine learning neural network model based on a desired dependent task which is affected by climate, to utilize the machine learning neural network model to perform climate-aware forecasting in connection with the desired dependent task;

re-train the machine learning neural network model based on the modified one or more parameters and the combined first prediction output and second prediction output; and perform a climate-aware forecasting process in connection with the desired dependent task by utilizing the re-trained machine learning neural network model to generate a vector representation of the forecast climate data for the future time period in connection with the desired dependent task.

20. The apparatus of claim 19, wherein the at least one processing device, when executing the program code, is further configured to learn a latent representation of the masked portion of the climate data by leveraging one or more adjacent un-masked portions of the climate data.

* * * * *